June 28, 1938. L. J. TICHOTA ET AL 2,121,937
OIL PAN ASSEMBLING DEVICE
Filed Nov. 21, 1936
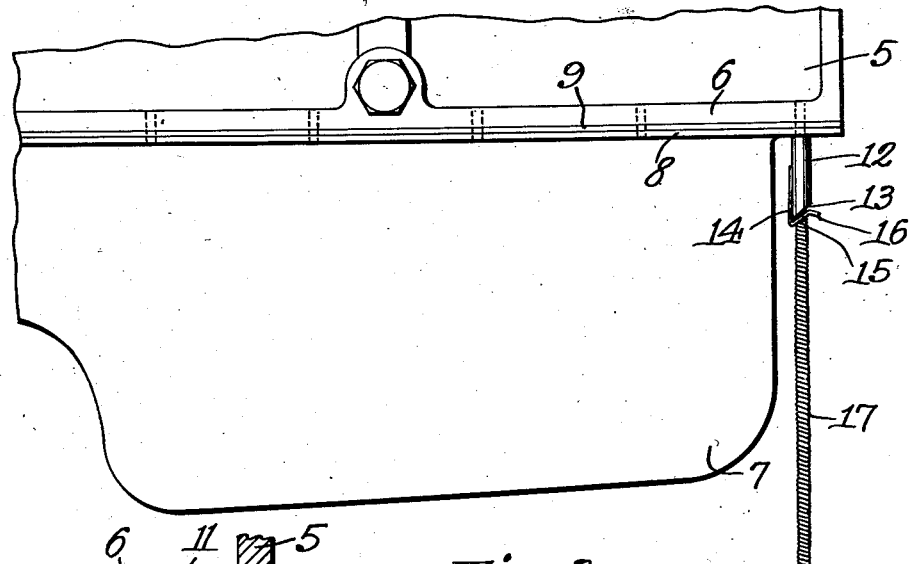
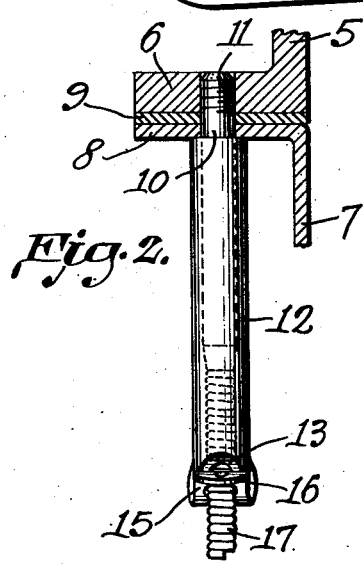
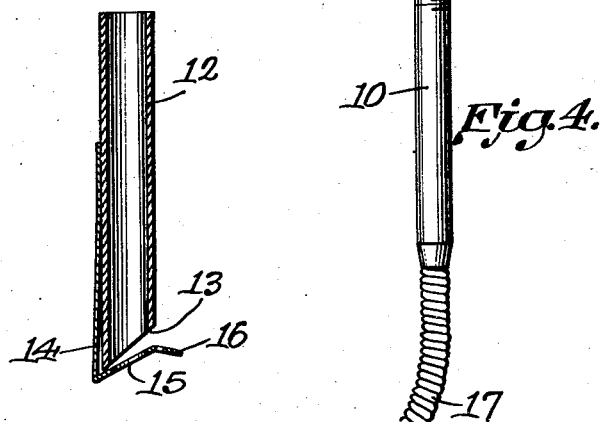
Inventors
Lumir J. Tichota
Rudolph V. Tichota
By CA Snowles
Attorneys Patented June 28, 1938

2,121,937

UNITED STATES PATENT OFFICE 2,121,937

OIL PAN ASSEMBLING DEVICE

Lumir J. Tichota and Rudolph V. Tichota, Dodge, Nebr.

Application November 21, 1936, Serial No. 112,119

2 Claims. (Cl. 29—89)

This invention relates to a device designed for use by automobile mechanics, the primary object of the invention being to provide means for aligning the openings of the crank case and oil pan of a motor vehicle, supporting the oil pan while the mechanic is in the act of positioning the usual bolts employed in securing the oil pan to the crank case.

An important object of the invention is to provide a device of this character which may be readily and easily operated by one hand so that the mechanic may support the pan with one hand to prevent slipping of the pan and packing, to throw the openings out of alignment.

Another object of the invention is to provide a supporting means which may be moved into engagement with the pan regardless of the thickness of the packing used between the crank case and pan.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view illustrating the device positioned to align the openings of the crank case and oil pan, and at the same time support the oil pan in position.

Figure 2 is an enlarged view partly in section, illustrating the device as positioned in the aligning openings in the crank case and oil pan.

Figure 3 is a longitudinal sectional view through the adjustable tubular member, forming a part of the device.

Figure 4 is an elevational view of the main portion of the device, and over which the member shown in Figure 3, operates.

Referring to the drawing in detail, the reference character 5 designates a portion of a crank case of a motor vehicle internal combustion engine, which is formed with the usual flange 6 that in turn is provided with spaced openings for the reception of the usual securing bolts employed in securing the oil pan to the crank casing.

As clearly shown, these openings are threaded to receive the threads of the usual securing bolts. The reference character 7 designates the usual oil pan employed in connection with the crank casing, and this oil pan is provided with the usual flange 8, which has openings so arranged that they will align with the openings of the flange of the crank case 5, as clearly shown by Figure 2 of the drawing so that when the securing bolts are positioned, they will secure the oil pan 7 to the crank case 5.

Positioned between the flanges of the crank case 5 and oil pan 7, is the usual packing member 9, which is also formed with openings that align with the openings of the flanges 6 and 8.

On positioning and securing the oil pan to the crank case, it is a difficult proposition to position the first two bolts and at the same time support the oil pan in such a way that the openings of the flanges 6 and 8 will align at all times. It is to prevent the movement of the oil pan while it is being positioned, that this device has been invented, and embodies an elongated member indicated by the reference character 10, which is provided with threads 11 at one end thereof. This member 10 is of a diameter so that it will fit within the aligned openings of the flanges 6 and 8, the threads 11 cooperating with the threads of the openings in the flange 6, to secure the elongated member in position. Slidably mounted over the elongated member 10, is a tubular member indicated by the reference character 12, the tubular member having one end thereof beveled as at 13, for purposes to be hereinafter more fully described.

The reference character 14 designates a spring arm which is secured to the tubular member 12, the free end of the spring arm being bent laterally as at 15, and provided with an opening, there being provided a finger piece 16, whereby the spring arm may be moved with respect to the tubular member 12.

Secured to one end of the elongated member 10 is a flexible arm 17, which is constructed preferably of heavy wire material coiled in a manner as shown by Figure 4 of the drawing. The diameter of the tubular member 12 is such that the tubular member 12 may be readily slid over the member 17, to a position on the elongated member 10, the laterally extended portion 15 of the spring arm 14, acting to engage between the convolutions of the member 17 securing the tubular member against movement with respect to the elongated member 10, after the tubular member 12 has been properly positioned.

In the use of the device, the elongated member is positioned within the aligning openings of the flanges 6 and 8 of the crank case and oil pan to be connected, the threads 11 of the elongated member being positioned in the threaded openings of the flange 6, with which the device is used. After the member 10 has been properly positioned, the tubular member 12 is slid along the member 10 until the upper end of the tubular member 12 engages the flange 8 of the oil pan. The laterally extended portion 15 of the spring arm 14 will now grip the member 17, holding the tubular member in its position of adjustment, and insuring against movement of the oil pan 7, as the bolts which are used to secure the oil pan to the crank case are positioned.

It might be further stated that two of these devices are used to support the oil pan in its proper position with respect to the case 5, while the bolts are being positioned in the remaining openings of the flanges 6 and 8. Thus it will be seen that with this device, it is absolutely impossible for the oil pan or packing used between the flanges of the oil pan and crank case, to become displaced in such a way that the openings thereof will not align to receive the usual securing bolts.

After two or more bolts have been positioned, the members 10 are removed and bolts positioned in the aligning openings from which the members 10 have been withdrawn.

Having thus described the invention, what is claimed is:

1. A supporting device for temporarily securing an oil pan to a crank case, comprising a threaded member adapted to extend through aligning openings of a pan and crank case, a flexible arm to which the threaded member is secured, a tubular member movable over the flexible member and threaded member and adapted to engage an oil pan, and means on the tubular member for frictionally engaging the flexible member, to secure the tubular member to the threaded member and in engagement with the oil pan.

2. A supporting device for temporarily securing an oil pan to a crank casing, comprising a threaded member adapted to extend through aligning openings of an oil pan and crank casing, a flexible member connected with the threaded member, a tubular member slidably mounted on the threaded member and adapted to move into engagement with an oil pan for holding an oil pan into engagement with a crank casing, and a spring arm secured to the tubular member and having an opening through which the flexible member extends, and said spring arm adapted to frictionally engage the flexible member, to secure the tubular member in various positions of adjustment.

LUMIR J. TICHOTA.
RUDOLPH V. TICHOTA.